(12) United States Patent
DeWind et al.

(10) Patent No.: US 12,313,096 B2
(45) Date of Patent: May 27, 2025

(54) FORKLIFT HYDRAULIC MOTOR BASED INDUSTRIAL DRIVER APPARATUS

(71) Applicant: One Pass Innovators, LLC, Zeeland, MI (US)

(72) Inventors: Ryan DeWind, Zeeland, MI (US); Gregory Allen DeWind, Zeeland, MI (US)

(73) Assignee: ONE PASS INNOVATORS, LLC, Zeeland, MI (US)

( * ) Notice: Subject to any disclaimer, the term of this patent is extended or adjusted under 35 U.S.C. 154(b) by 0 days.

(21) Appl. No.: 17/558,456

(22) Filed: Dec. 21, 2021

(65) Prior Publication Data

US 2022/0196041 A1     Jun. 23, 2022

Related U.S. Application Data

(60) Provisional application No. 63/128,605, filed on Dec. 21, 2020.

(51) Int. Cl.

| | |
|---|---|
| *F15B 15/18* | (2006.01) |
| *B21L 21/00* | (2006.01) |
| *B23P 19/04* | (2006.01) |
| *B23P 19/06* | (2006.01) |
| *B27B 33/14* | (2006.01) |
| *B28D 1/12* | (2006.01) |
| *E01B 29/28* | (2006.01) |
| *E02F 3/14* | (2006.01) |
| *E21C 25/36* | (2006.01) |

(Continued)

(52) U.S. Cl.
CPC .............. *F15B 15/18* (2013.01); *B21L 21/00* (2013.01); *B23P 19/04* (2013.01); *B23P 19/06* (2013.01); *E01B 29/28* (2013.01); *F15B 13/02* (2013.01); *F15B 21/0423* (2019.01); *B27B 33/144* (2013.01); *B27B 33/148* (2013.01); *B28D 1/125* (2013.01); *E02F 3/143* (2013.01); *E21C 25/36* (2013.01)

(58) Field of Classification Search
CPC ........ B21L 21/00; B23P 19/04; B27B 33/144; B27B 33/148; B28D 1/125; E01B 29/28; E02F 3/143; E21C 25/36; F15B 15/18
See application file for complete search history.

(56) References Cited

U.S. PATENT DOCUMENTS

| | | | | |
|---|---|---|---|---|
| 2,552,655 A | * | 5/1951 | Talboys | ................... E01B 29/24 |
| | | | | 81/57.25 |
| 3,064,428 A | * | 11/1962 | Plasser | ..................... E01B 29/28 |
| | | | | 60/462 |

(Continued)

*Primary Examiner* — Matthew Wiblin
(74) *Attorney, Agent, or Firm* — The Watson IP Group, PLC; Jovan N. Jovanovic

(57) ABSTRACT

An industrial driver apparatus includes a forklift hydraulic motor, a drive shaft adapter, a hydraulic pump, and a frame. The forklift hydraulic motor includes a housing and a drive shaft. The drive shaft adapter is coupled to the drive shaft of the forklift hydraulic motor and adapts the drive shaft of the forklift hydraulic motor to a dimension of a threaded component being driven by the forklift hydraulic motor. The hydraulic pump pressurizes a hydraulic fluid used to drive the forklift hydraulic motor. The frame is coupled to a housing of the forklift hydraulic motor and prevents the forklift hydraulic motor from rotating while the drive shaft rotates the threaded component.

11 Claims, 9 Drawing Sheets

(51) Int. Cl.
*F15B 13/02* (2006.01)
*F15B 21/0423* (2019.01)

(56) References Cited

U.S. PATENT DOCUMENTS

| | | | | |
|---|---|---|---|---|
| 3,108,507 A * | 10/1963 | Quarve | B25H 1/0021 | |
| | | | 173/112 | |
| 3,120,193 A * | 2/1964 | Pettigrew | E01B 29/32 | |
| | | | 104/17.2 | |
| 3,142,210 A * | 7/1964 | Rodgers | B62D 55/32 | |
| | | | 81/57.25 | |
| 4,167,058 A * | 9/1979 | Janssen | B62D 55/32 | |
| | | | 29/822 | |
| 4,403,663 A * | 9/1983 | Janssen | B25B 23/141 | |
| | | | 192/150 | |
| 4,432,257 A * | 2/1984 | Yamamoto | B25H 1/0021 | |
| | | | 81/55 | |
| 5,005,654 A * | 4/1991 | Moriki | B23P 19/06 | |
| | | | 173/183 | |
| 5,186,262 A * | 2/1993 | Thompson | B25B 23/14 | |
| | | | 173/218 | |
| 2015/0316919 A1 * | 11/2015 | Junkers | G05B 19/182 | |
| | | | 700/275 | |
| 2019/0003131 A1 * | 1/2019 | Widlroither | E01B 29/28 | |
| 2020/0024809 A1 * | 1/2020 | Widlroither | E01B 29/24 | |

* cited by examiner

FORKLIFT HYDRAULIC MOTOR BASED INDUSTRIAL DRIVER APPARATUS

CROSS-REFERENCE TO RELATED APPLICATION

This application claims priority from U.S. Provisional Patent Application Ser. No. 63/128,605 filed on Dec. 21, 2020, entitled "FORKLIFT HYDRAULIC MOTOR BASED INDUSTRIAL DRIVER APPARATUS", the entire disclosure of which is hereby incorporated by reference in its entirety.

BACKGROUND OF THE DISCLOSURE

1. Field of the Disclosure

The disclosure relates in general to a driver, and more particularly, to a forklift hydraulic motor based industrial driver apparatus.

2. Background Art

A forklift, also known as a tow motor, lift truck, fork truck, forklift truck, fork hoist, is typically used to lift and move extremely heavy objects over short distances. For example, forklifts are used in warehouses and distribution centers to lift and move pallets of goods, and raise/lower them for placement/removal from industrial shelves. Forklifts are also used to drive onto semi-trucks to load and unload goods onto these trucks. Typically, forklifts have "L" shaped forks on a front thereof to lift and raise goods, these forks being powered by a high torque forklift hydraulic motor. Because forklifts have become so widely used throughout the world, economics of scale has made their replacement/repair parts relatively inexpensive.

SUMMARY OF THE DISCLOSURE

The disclosure is directed to an industrial driver apparatus that includes a forklift hydraulic motor, a drive shaft adapter, a hydraulic pump, and a frame. The forklift hydraulic motor includes a housing and a drive shaft. The drive shaft adapter is coupled to the drive shaft of the forklift hydraulic motor and adapts the drive shaft of the forklift hydraulic motor to a dimension of a threaded component being driven by the forklift hydraulic motor. The hydraulic pump pressurizes a hydraulic fluid used to drive the forklift hydraulic motor. The frame is coupled to a housing of the forklift hydraulic motor and prevents the forklift hydraulic motor from rotating while the drive shaft rotates the threaded component.

In some configurations, the industrial driver apparatus further comprises a control panel to control at least one of a direction of rotation of the drive shaft and an amount of torque applied to the drive shaft.

In some configurations, the control panel includes a lever to actuate a hydraulic valve.

In some configurations, the industrial driver apparatus further comprises a handle that is coupled to the housing of the forklift hydraulic motor, the handle allowing an operator to manipulate an angle of the forklift hydraulic motor.

In some configurations, the threaded component is a digging tooth on a trencher chain for use with a trencher.

In some configurations, a system includes the industrial driver apparatus further comprises a cooling device to cool the pressurized hydraulic fluid.

In some configurations, the system further comprises a fan to move air across a radiator within the cooling device to increase a cooling efficiency of the radiator. In some configurations, a system including the industrial driver apparatus further comprises a hydraulic motor, coupled to the frame, with the pressurized hydraulic fluid further driving the hydraulic motor to move a position of the industrial driver apparatus in relation a position of the threaded component after having been installed.

In some configurations, the system includes further includes an elongated platform with an elongated edge along a side of the elongated platform. The industrial driver apparatus further comprises a wheel coupled to the hydraulic motor to move the industrial driver apparatus along a length of the elongated platform.

In some configurations, the frame includes a first leg member, a second leg member, and a crossbeam member. The first leg member is disposed on a first elongated side of the elongated platform and the second leg member is disposed on a second elongated side of the elongated platform. The crossbeam member is coupled to both the first and second leg members such that the first leg member, the second leg member, and the crossbeam member support the forklift hydraulic motor disposed above the elongated platform.

In some configurations, the frame further comprises a forklift hydraulic motor support member coupled to the crossbeam member.

In some configurations, the forklift hydraulic motor support member both rotates in a circle relative to the crossbeam member and pivots about the crossbeam member to allow the forklift hydraulic motor to move toward and away from the elongated platform.

In some configurations, the forklift hydraulic motor support member is angled along a length of the forklift hydraulic motor support member to increase a distance between a surface of the elongated platform and the drive shaft adapter.

In some configurations, the hydraulic pump is disposed proximate to a first end of the forklift hydraulic motor support member and the forklift hydraulic motor is disposed proximate to a second end of the forklift hydraulic motor support member.

In some configurations, the forklift hydraulic motor further includes a coupler coupled to the housing on an opposite end of the forklift hydraulic motor that the drive shaft is disposed. The coupler couples the forklift hydraulic motor to the frame.

In some configurations, the coupler allows for movement of the forklift hydraulic motor in a single plane substantially in line with the forklift hydraulic motor support member.

In some configurations, the industrial driver apparatus further comprises an ON/OFF switch, disposed proximate to the forklift hydraulic motor, to control electrical power to the hydraulic pump.

BRIEF DESCRIPTION OF THE DRAWINGS

The disclosure will now be described with reference to the drawings wherein.

DETAILED DESCRIPTION OF THE DISCLOSURE

Figure 1:
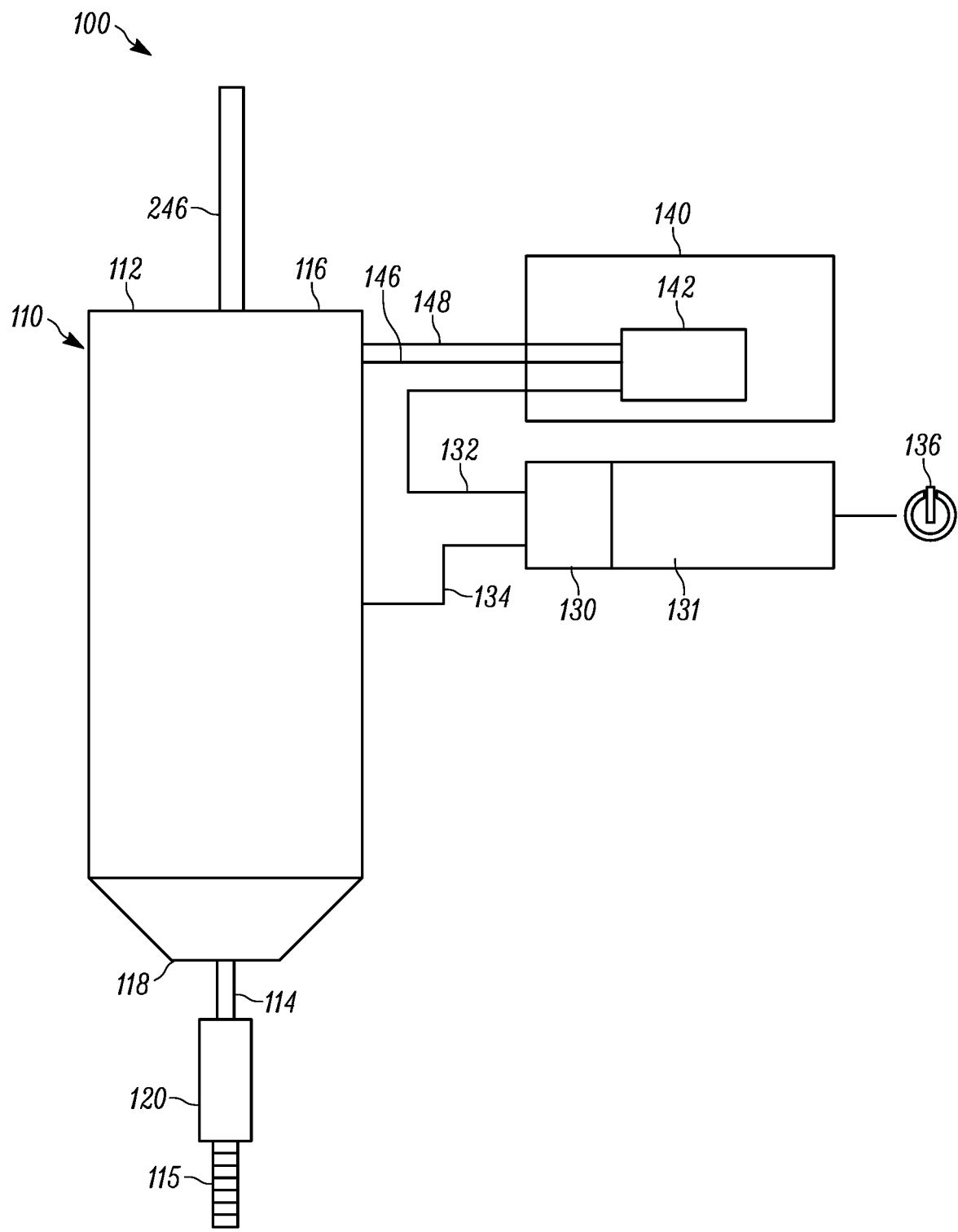
FIG. 1 illustrates an example of a forklift hydraulic motor based industrial driver apparatus, in accordance with at least one embodiment disclosed herein.
Figure 2:
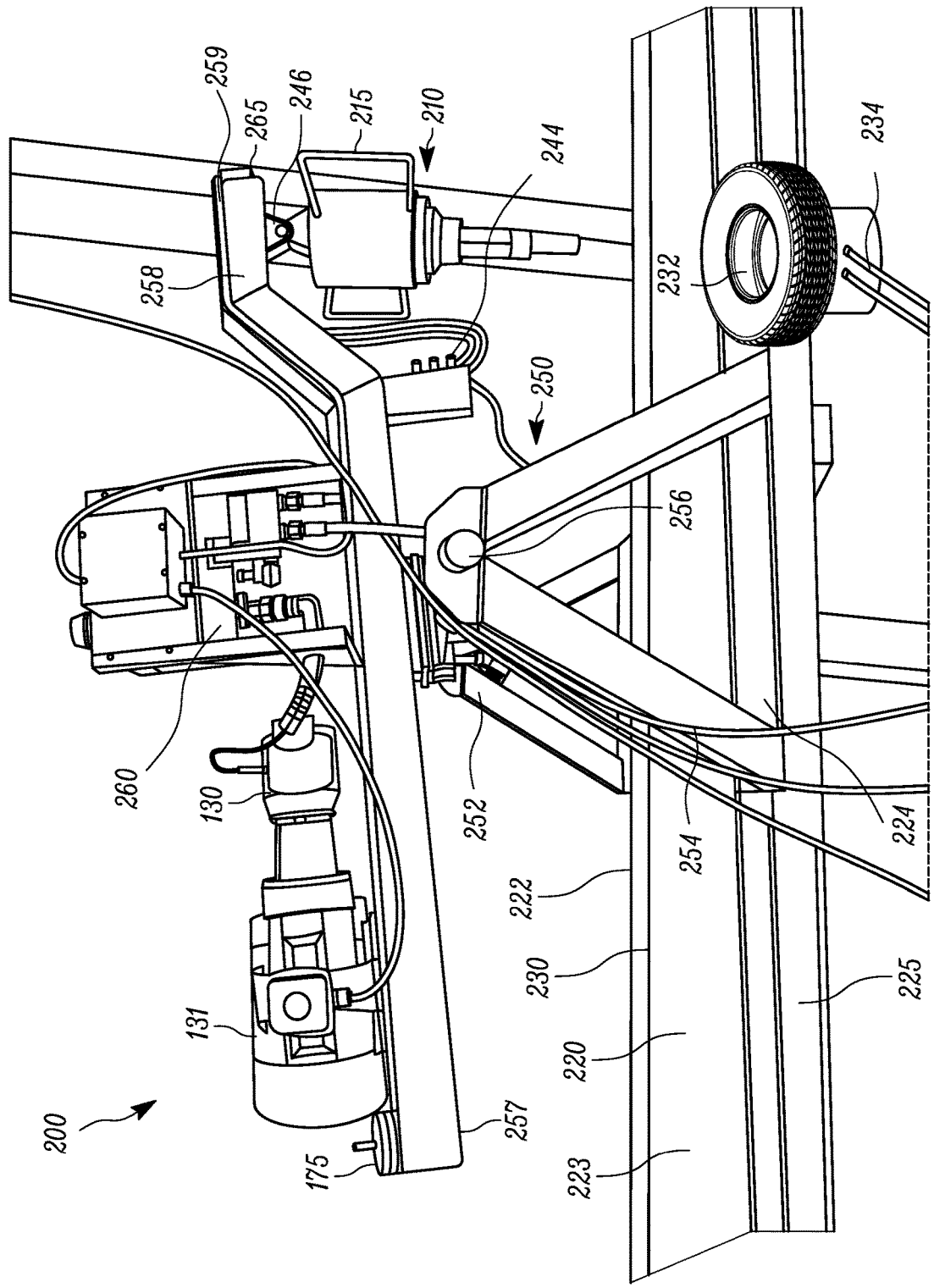
FIG. 2 illustrates an isometric view of a system including another example of a forklift hydraulic motor based industrial driver apparatus, in accordance with at least one embodiment disclosed herein.

While this disclosure is susceptible of embodiment(s) in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

It has become appreciated that typical industrial drivers are very expensive to purchase, such as those used to assembly large industrial machinery using large threaded components requiring substantial torque to assemble/disassemble. It has also become appreciated that the core technology used for such typical industrial drivers is a high torque hydraulic motor. As discussed above, forklifts lift extremely heavy objects, which typically use a high torque hydraulic motor. Since forklifts are used throughout the world, these hydraulic motors can be manufactured in relatively large quantities which brings their cost down significantly. To overcome such a cost deficiency within the art of industrial drivers, the disclosed industrial driver utilizes such a forklift hydraulic motor as a source for driving torque. Thus, utilizing such a forklift hydraulic motor as the source for driving torque, the cost of manufacturing an industrial driver based on such a forklift hydraulic motor can be reduced significantly.

Referring now to the drawings and in particular to FIG. 1, an example apparatus is disclosed, such as a forklift hydraulic motor based industrial driver 100, is shown. The industrial driver 100 includes a forklift hydraulic motor 110 that has a housing 112 and a drive shaft 114. In at least one embodiment, the industrial driver 100 can include a handle 215 (FIGS. 2-7) coupled to the housing 112 of the forklift hydraulic motor 110. This handle 215 allows an operator to manipulate an angle of the forklift hydraulic motor 110, and manipulate a proximity of the drive shaft adapter 120 to a workpiece, e.g., a trencher chain 810 (FIG. 8) that the threaded component 115 is to be installed/removed. In at least one embodiment, the drive shaft 114 is cylindrical, having a substantially constant (+−1%) diameter along its length, although other shapes are possible.

Likewise, in at least one embodiment the housing 112 is cylindrical having a substantially constant (+−1%) diameter along its length, although other shapes are possible. The housing 112 includes a first end 116 and a second end 118, the drive shaft 114 protruding through the housing 112 at the second end 118 of the housing 112. In at least one embodiment, the forklift hydraulic motor 110 can include a coupler 246 (FIGS. 2-7) coupled to the housing 112 on an opposite end of the forklift hydraulic motor 110 that the drive shaft 114 is disposed, such as the first end 116, this coupler 246 coupling the forklift hydraulic motor 110 to the frame 140. As shown, the coupler 246 can be of the type that allows for movement of the forklift hydraulic motor 110 in a single plane substantially in line with a forklift hydraulic motor support member 258 (FIGS. 2-7).

As discussed above, the forklift hydraulic motor 110 is the type of hydraulic motor typically used by a forklift to lift extremely heavy objects. Because of economics of scale, this cost of the forklift hydraulic motor 110 is substantially less than those used by typical comparatively small volume industrial drivers. In at least one other embodiment, other forklift hydraulic motors can be used for the industrial driver 100, without departing from the scope of the embodiments.

The industrial driver 100 further includes a drive shaft adapter 120. The drive shaft adapter 120 is coupled to the drive shaft 114 (e.g., bolted, welded, bonded, or any other coupling that secures the drive shaft adapter 120 to the drive shaft 114) of the forklift hydraulic motor 110, as shown. In at least one embodiment, the drive shaft adapter 120 is cylindrical, although other shapes are possible. The drive shaft adapter 120 adapts the drive shaft 114 of the forklift hydraulic motor 110 to a dimension of a threaded component 115 being driven by the forklift hydraulic motor 110. For example, one end of the drive shaft adapter 120 can accept the cylindrical shape of the drive shaft 114 and the other end of the drive shaft adapter 120 can have an opening, such as a hexagonal opening, to securely grasp the threaded component 115 being driven by the forklift hydraulic motor 110. In at least one other embodiment, the other end of the drive shaft adapter 120 can be any shape needed to securely grasp the threaded component 115 being driven. In at least one embodiment, the drive shaft adapter 120 can be self-adjusting to adjust to a variety of shapes possibly used for variously sized threaded components.

Figure 8:
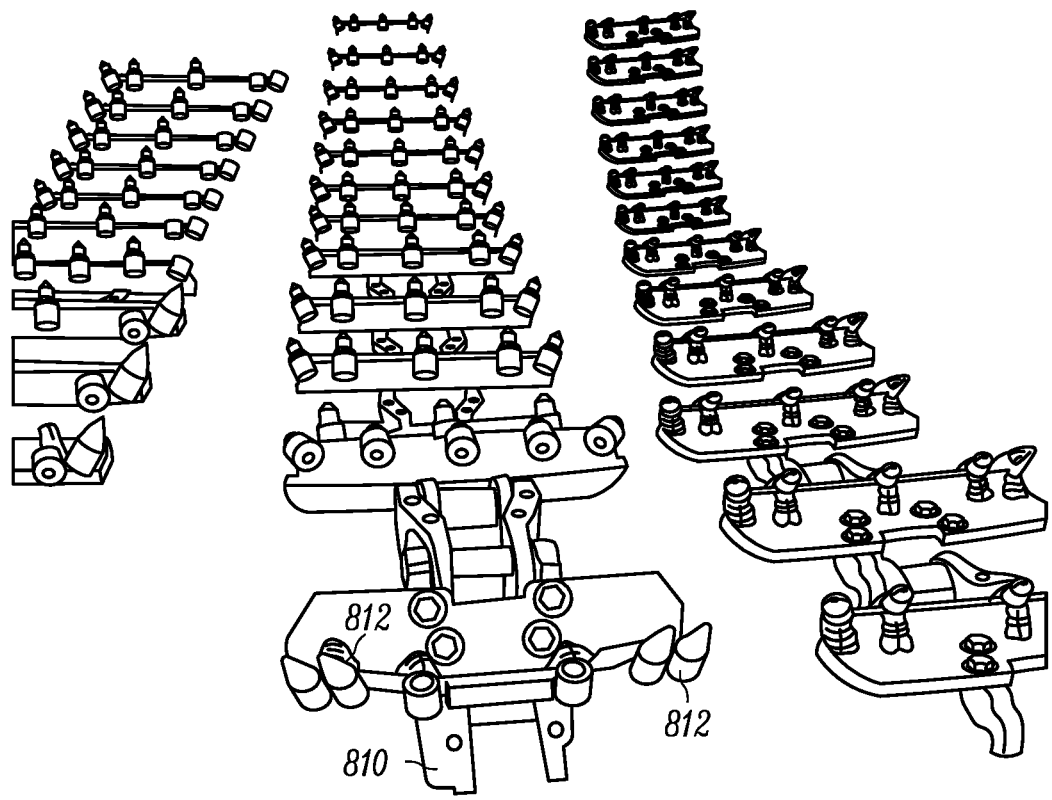
FIG. 8 illustrates an example trencher chain including an example digging tooth, in accordance with at least one embodiment disclosed herein.
Figure 9:
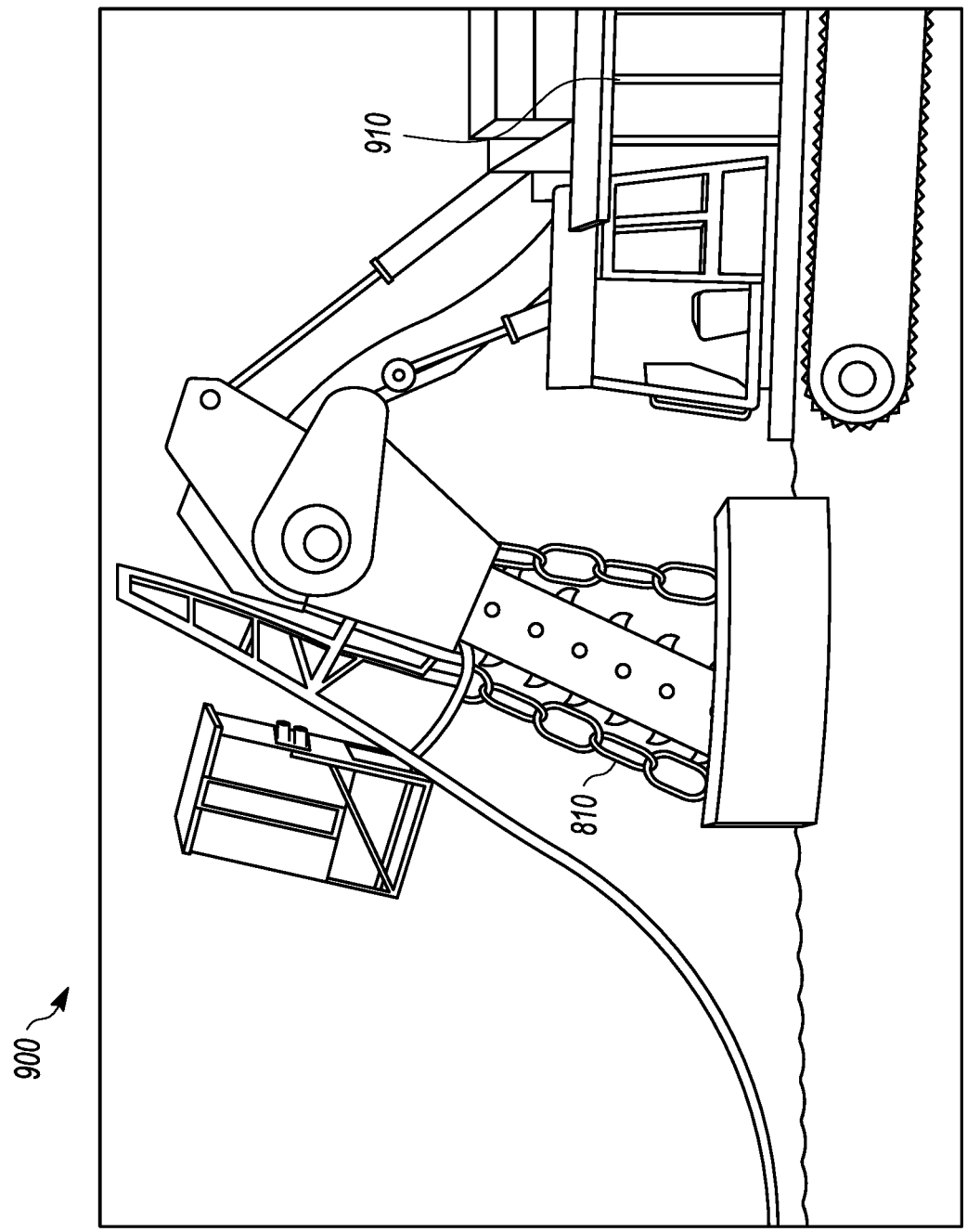
FIG. 9 illustrates an example system including a trencher using the trencher chain illustrated in FIG. 8, in accordance with at least one embodiment disclosed herein.

An example of the threaded component 115 that can be driven, i.e., installed/removed, is a digging tooth 812 (FIG. 8) on a trencher chain 810 (FIG. 8) for use within a system 900 that includes an industrial trencher 910 (FIG. 9). Such an industrial trencher 910 can be of the type developed by DeWind Corporation. Such an industrial trencher 910 can be of the type that uses one-pass trenching technology, such as model MT2000 or MT3500. The industrial trencher 910 installs various types of systems deeper, faster, safer, and at less cost than most conventional alternatives. The MT 3500 (e.g., with up to 3,500 horse power) can reach depths of up to 125' feet below grade for "Mix In Place" walls, such as soil Bentonite Walls, and soil cement Bentonite wall installations. The industrial trencher 910 can mixed-in-place soil Bentonite and soil, cement Bentonite into a completely homogenized wall from top to bottom and from start to finish. These one-pass trenchers utilize a continuous vertical mixing that eliminates possibility for window or voids in the wall. One-pass barrier walls are evenly and consistently mixed throughout. These one-pass trenchers can mix a heavy high slump mix in place. This ability to mix a super heavy slump makes one-pass ideal for dam and levee repair.

These one-pass trenchers can use underground water injection nozzles, pre-mixed slurry injection ports, speed controls for both the mixing chain and track speeds, GPS mapping and laser guides to control depth. Engineers who use these one-pass trenchers prefer them to conventional excavator installation methods because of the completely homogenized soils from top to bottom, secure key into confining layer, no possibility for voids in the wall, precise laser installations, no messing mixing ponds, ability to work in tight sites, no open excavation and fast installation rates with a precise mapping of the alignment for future use. These one-pass trenchers can build trenches that are 125'+ deep, are 12"-48" wide, and can build 200-500 linear feet per day.

The industrial driver 100 further includes a hydraulic pump 130 attached to an electric motor 131 to pressurize a hydraulic fluid used to drive the forklift hydraulic motor 110. The hydraulic pump 130 is coupled to a low pressure return line 132 that is also coupled to the forklift hydraulic motor 110. The hydraulic pump 130 is also coupled to a high pressure line 134. The hydraulic pump 130 can be of the type that is typically used on forklifts, which again because of economist of scale are relatively inexpensive. In at least one other embodiment, the hydraulic pump 130 can be of the type that are used for other high pressure applications, such as excavators, cranes, loaders, tractors, vacuum trucks, forestry equipment, graders, dump trucks, mining machinery, or any other high pressure application.

In some instances where the hydraulic pump 130 generates such high pressure that hydraulic fluid leaving the hydraulic pump 130 is of a high temperature. In at least one embodiment, a cooling device 260 (FIGS. 2-7), part of a system 200, can be disposed between the hydraulic pump 130 and the forklift hydraulic motor 110. The cooling device 260 cools the pressurized hydraulic fluid, this high temperature hydraulic fluid. In at least one embodiment, a fan 262 is coupled to the cooling device 260 to move air across a radiator 264 within the cooling device 260 to increase a cooling efficiency of the radiator 264. The cooling device 260 can be disposed above a crossbeam 256 (FIGS. 2-7), such approximately centrally above the forklift hydraulic motor support member 258, such that its weight does not change a balance of the forklift hydraulic motor support member 258.

The industrial driver 100 further includes a frame 140 that is coupled to the housing 112 (e.g., bolted, welded, bonded, or any other method of securing the frame 140 to the housing 112) of the forklift hydraulic motor 110. The frame 140 prevents the forklift hydraulic motor 140 from rotating while the drive shaft 114 rotates the threaded component 115, such as the digging tooth 812 on the trencher chain 810 (FIG. 8). To support the forklift hydraulic motor 110, the frame can be constructed from steel, aluminum, or any other material that has the strength to prevent the forklift hydraulic motor 140 from rotating while the drive shaft 114 rotates the threaded component 115, and in some embodiment(s) support a weight of the industrial driver 100. In at least one embodiment, the frame 140 can include a plurality of members, an example of which is shown in FIGS. 2-7, discussed in more detail below.

In at least one embodiment, the industrial driver 100 further includes a control panel 140 to control at least one of a direction of rotation of the drive shaft 114 and an amount of torque applied to the drive shaft 114 by the forklift hydraulic motor 110, such as by at least one hydraulic valve 142 within the control panel 140. In at least one embodiment, the high pressure line 134 from the hydraulic pump 130 is coupled to the control panel 140. In at least one other embodiment, the high pressure line 134 is directly coupled to the forklift hydraulic motor 110, with the forklift hydraulic motor 110 being activated simply by applying an electrical power 136 to the forklift hydraulic motor 110. The control panel 140 can include at least one lever 244 (FIGS. 2-7) to actuate the at least one hydraulic valve 142 within the control panel 140. The hydraulic valve 142 can be coupled to two high pressure lines 146/146 that couple the hydraulic valve 142 to the forklift hydraulic motor 110. The hydraulic valve 142 can direct high pressure hydraulic fluid in either of the two high pressure lines 146/146 to control a direction of rotation of the drive shaft 114.

Now with reference to FIGS. 2-7, another example apparatus is shown, an industrial driver apparatus 210, with the system 200 including the industrial driver apparatus 210. As discussed above, the industrial driver apparatus 210 can be used to install/remove teeth 812 on a trencher chain 810 (FIGS. 8 and 9). For this application of the industrial driver apparatus 210, it is convenient for operator access to place the trencher chain 810 on an elongated platform 220. The industrial driver apparatus 210 is disposed above and centrally between a width of the elongated platform 220, straddling the elongated platform 220 as shown. In this example, the frame 140 can be a frame 250 that includes a first leg member 252, a second leg member 254, and a crossbeam member 256. The first leg member is disposed on a first elongated side 222 of the elongated platform 220 (and, slidably within first channel 223), and the second leg member is disposed on a second elongated side 224 of the elongated platform 220 (and slidably within second channel 225). The crossbeam member 256 (having a cylindrical configuration) is coupled to both the first and second leg members 252/254 such that they support the forklift hydraulic motor 110 disposed above the elongated platform 220.

In at least one embodiment, the elongated platform 220 includes an elongated edge 212 along a side 214 of the elongated platform 220. Instead of having to move the trencher chain 180 in relation to the industrial driver apparatus 210, the industrial driver apparatus 210 is further comprised of a wheel 232 that is coupled to a second hydraulic motor 234 (attached to the same hydraulic pump) disposed along the elongated platform 220 outside of the second channel 225 and in contact therewith. The hydraulic motor 234 turns the wheel 232 to move the industrial driver apparatus 210 along a length of the elongated edge 212 of the elongated platform 220, that is to chance a position of the industrial driver apparatus 210 relative to a position of the threaded component 115, such as after having been installed. As shown, hydraulic lines extend to/from the hydraulic motor 234 to drive the hydraulic motor 234. These hydraulic lines can run to a control panel 240. An operator of the control panel 240 can actuate the hydraulic motor 234 to move the industrial driver apparatus 210 in either direction along a length of the elongated platform 220.

Figure 3:
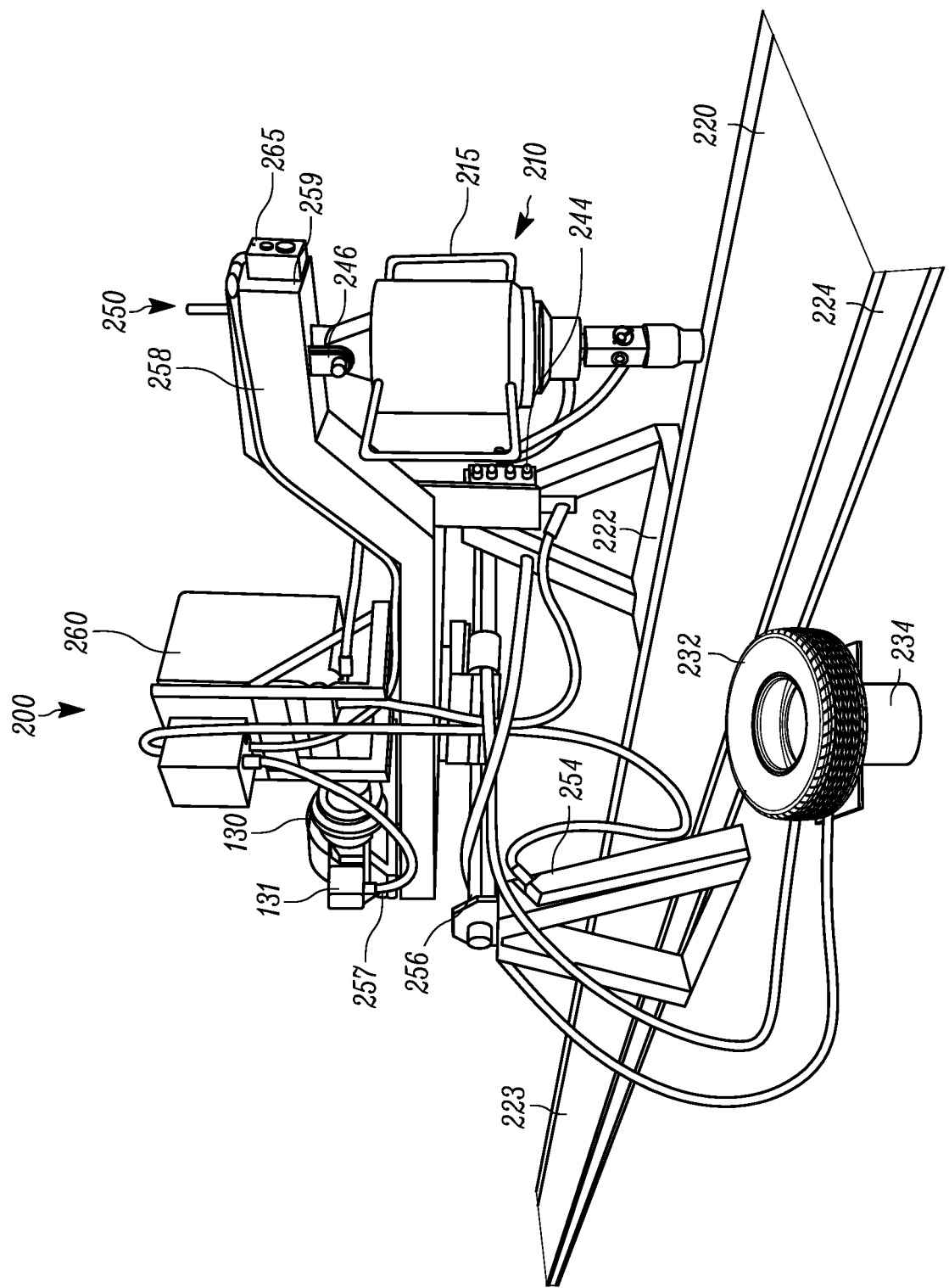
FIG. 3 illustrates another isometric view of the system shown in FIG. 2, in accordance with at least one embodiment disclosed herein.
Figure 4:
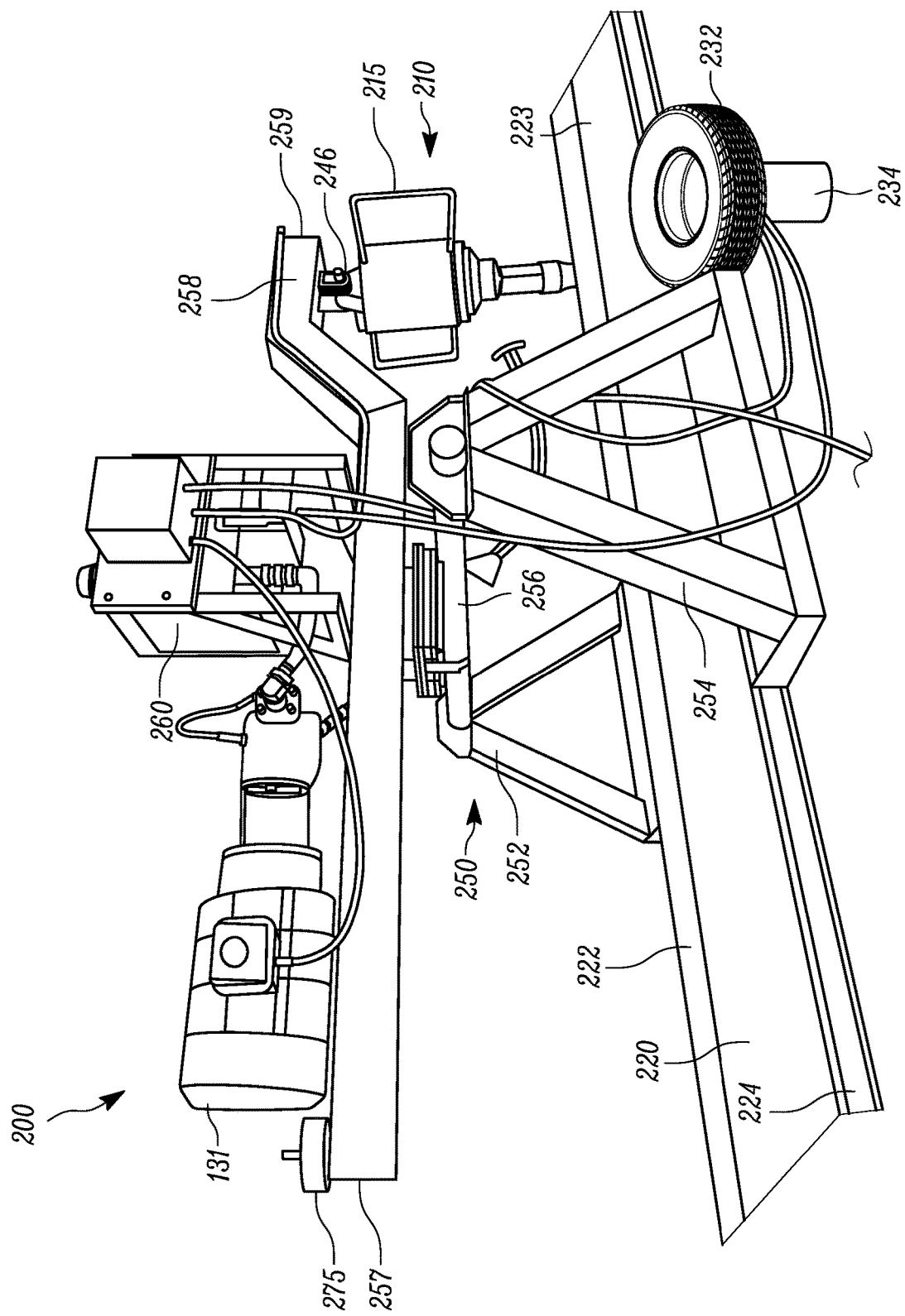
FIG. 4 illustrates yet another isometric view of the system shown in FIG. 2, in accordance with at least one embodiment disclosed herein.
Figure 5:
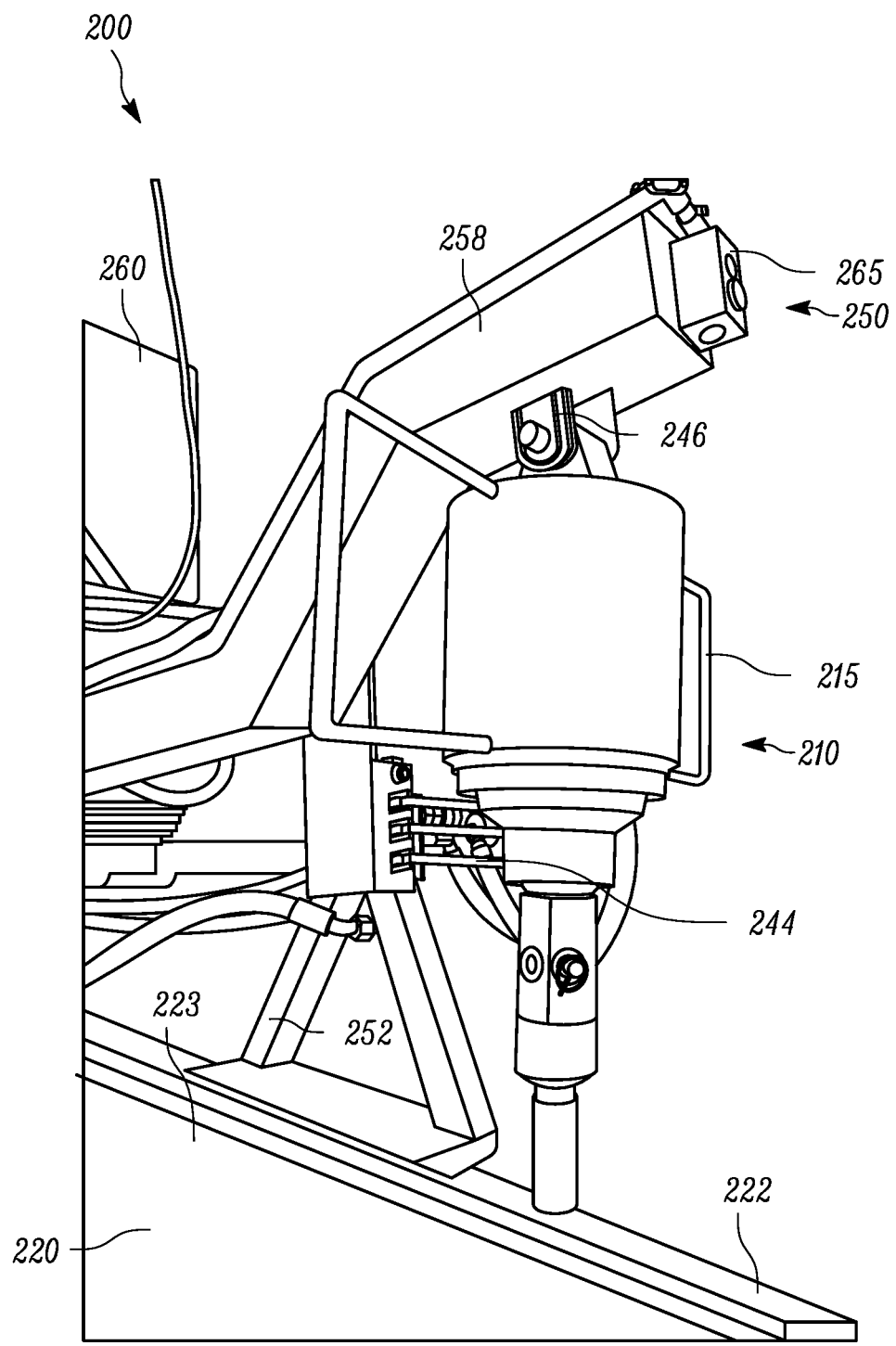
FIG. 5 illustrates even yet another isometric view of the system shown in FIG. 2, in accordance with at least one embodiment disclosed herein.
Figure 6:
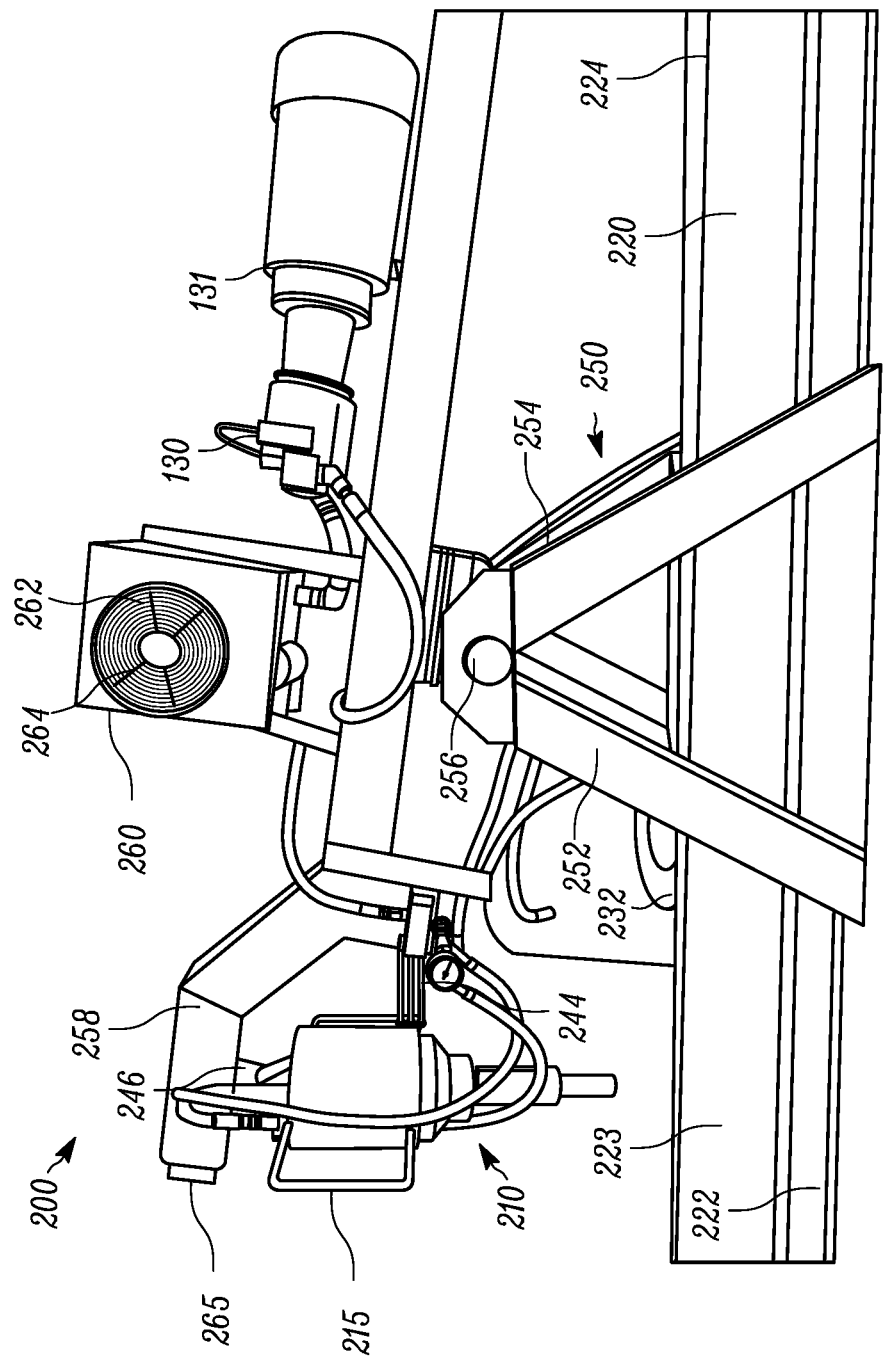
FIG. 6 illustrates even another isometric view of the system shown in FIG. 2, as looking down into a housing of a hopper.
Figure 7:
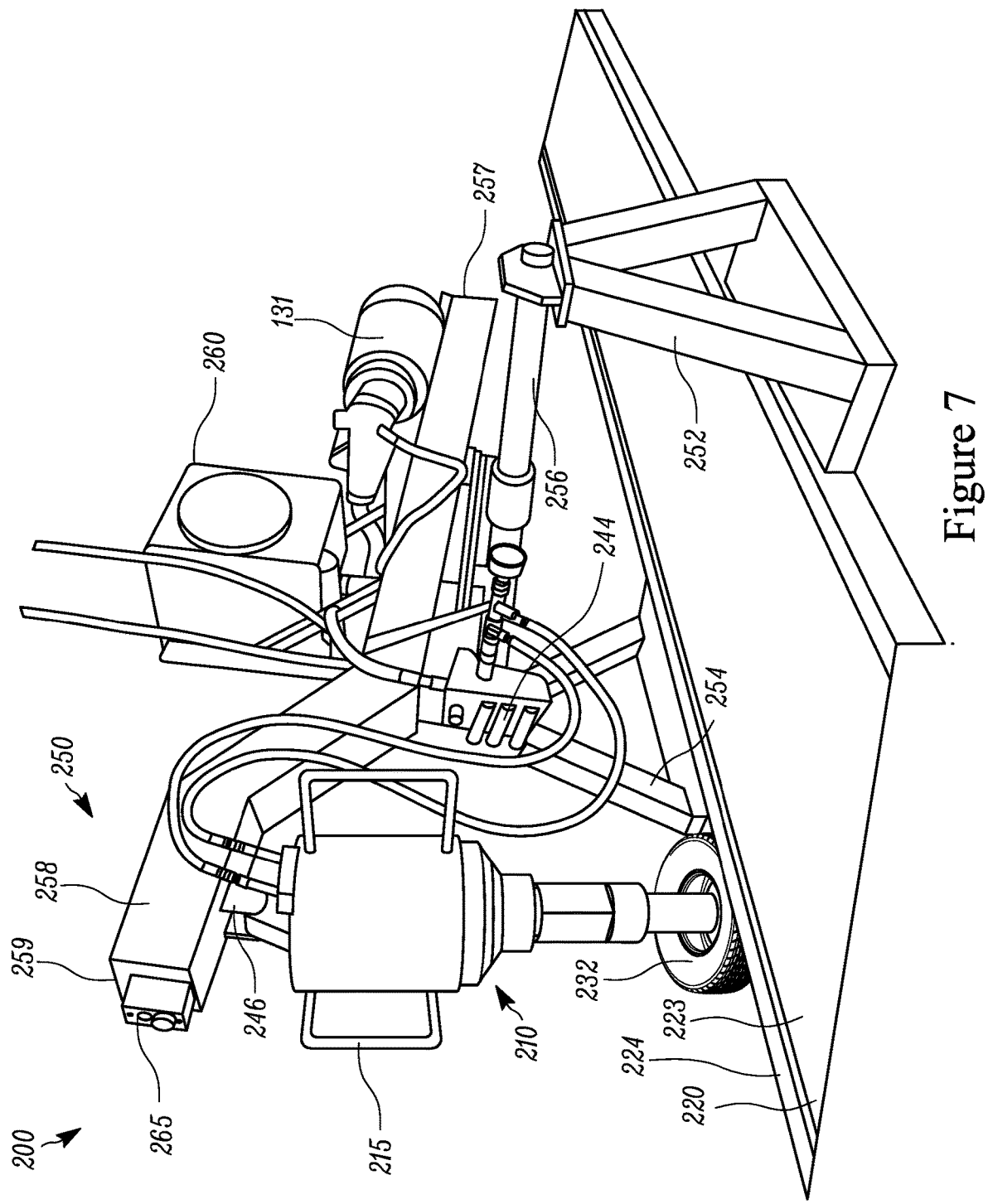
FIG. 7 illustrates one more isometric view of the system shown in FIG. 2, in accordance with at least one embodiment disclosed herein.

In at least one embodiment, the frame 250 can further include a forklift hydraulic motor support member 258 coupled to the crossbeam member 256. The forklift hydraulic motor support member 258 rotates in a circle relative to the crossbeam member 256, to allow the forklift hydraulic motor 110 to swing between proximate sides of the elongated platform 220. The forklift hydraulic motor support member 258 also pivots about the crossbeam member 256 to allow the forklift hydraulic motor 110 to move up and down, or towards and away from the elongated platform 220. FIGS. 2, 5, 6, and 7 show the forklift hydraulic motor support member 258 pivoted away from the elongated platform 220, and FIGS. 3 and 4 show the forklift hydraulic motor support member 258 pivoted towards the elongated platform 220. This full motion of the forklift hydraulic motor 110 provided by the frame 250 allows the forklift hydraulic motor 110 to install/remove the threaded component 115 anywhere that it may be disposed on the elongated platform 220. In at least one embodiment, an ON/OFF switch 265 can be disposed proximate to the forklift hydraulic motor 110 and which controls the electrical power 136 being applied to the hydraulic pump 130. For example, the ON/OFF switch 265 can be disposed on an end of the forklift hydraulic motor support member 258 proximate to the forklift hydraulic motor 110, as shown.

In at least one embodiment, the forklift hydraulic motor support member 258 is angled along a length of the forklift hydraulic motor support member 258 to increase a distance between a surface 223 of the elongated platform 220 and the drive shaft adapter 120, as shown. In at least one embodiment, the hydraulic pump 130 is disposed proximate to a first end 257 of the forklift hydraulic motor support member 258 and the forklift hydraulic motor 110 is disposed proximate to a second end 259 of the forklift hydraulic motor support member 258, as shown. This disposition of the hydraulic pump 130 and the forklift hydraulic motor 110 proximate to opposite ends of the forklift hydraulic motor support member 258 helps to balance weight across the forklift hydraulic motor support member 258, such an operator can more easily move the forklift hydraulic motor 110. To further assist in balancing this weight across the forklift hydraulic motor support member 258, a weight stack 175 can disposed proximate to the first end 257 to counter a weight of the forklift hydraulic motor 110.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A system for driving treaded components comprising:
an elongated platform having a first end and a second end, with a first side and a second side opposing the first side and extending between the first end and the second end;
a frame extending from the elongated platform, the frame having a first leg associated with the first side and a second leg associated with the second side, and a crossbeam member coupling the first leg to the second leg and extending across the elongated platform spaced apart from the elongated platform, the crossbeam member being cylindrical with a circular cross-sectional area and defining a longitudinal axis extending therethrough;
a hydraulic motor support member having a central region, a first end and a second end opposite the first end, the hydraulic motor support member pivotably coupled to the crossbeam member at the central region between the first end and the second end and structurally configured to both pivot side to side and also pivot in an up and down manner, so as to allow the hydraulic motor support member to pivot about two different axis relative to the crossbeam member, thereby allowing the first end and the second end of the hydraulic motor support member to swivel relative to the crossbeam member between the first side and the second side of the elongated platform, and to allow the hydraulic motor support member to pivot about the longitudinal axis defined by the crossbeam member, the crossbeam member acting as a fulcrum to allow the first end and the second end of the hydraulic motor support member to rotate closer and further away from the elongated platform, the central region having a protrusion portion directly interfacing with the crossbeam member, the protrusion portion having an single height, the height of the protrusion portion establishing a distance between the central region of the hydraulic motor support member and the crossbeam member, the hydraulic motor support member defining a longitudinal axis, wherein a length of the hydraulic motor support member proximate to the second end is offset so as to increase a distance between the elongated platform and the second end of the hydraulic motor support member;
a hydraulic pump driven by an electric motor, the hydraulic pump and the electric motor coupled to the hydraulic motor support member between the first end and the central region; and
a hydraulic motor coupled to the hydraulic pump, the hydraulic motor having an upper end with a pivot region at the upper end, the pivot region coupled via a yoke-coupler to the second end of the hydraulic motor support member so as to pivotably suspend the hydraulic motor from the second end of the hydraulic motor support member, the hydraulic motor having a housing and a shaft extending therefrom, the shaft being interfaceable with a threaded member positioned on the elongated platform.

2. The system of claim 1 wherein the hydraulic motor is pivotably suspended from the second end of the hydraulic motor support member so as to permit single plane pivoting substantially in line with the hydraulic support member.

3. The system of claim 1 wherein at least one handle is coupled directly to the hydraulic motor to facilitate movement thereof.

4. The system of claim 1 further comprising at least one weight that is releasably attachable to the first end of the hydraulic motor support member so as to facilitate balancing of the hydraulic motor support member relative to the crossbeam member.

5. The system of claim 1 wherein the frame is slidably movable along the elongated platform.

6. The system of claim 5 further comprising:
a second hydraulic motor attached to the second leg on an outside of the second side of the elongated platform, the second hydraulic motor coupled to the hydraulic pump; and
a wheel driven by the second hydraulic motor, the wheel engageable with the second side of the elongated platform so as to direct the frame toward either one of the first end and the second end along the elongated platform.

7. The system of claim 6 wherein the first side includes an outwardly facing first channel and the second side includes an outwardly facing second channel, with the first leg slidably movable within the first channel, and the second leg slidably movable within the second channel.

8. The system of claim 7 wherein the wheel engages the second channel.

9. The system of claim 1 wherein the hydraulic motor is a hydraulic motor from a forklift.

10. The system of claim 1 further comprising an adapter attachable to the shaft of the hydraulic motor, the adapter being attachable to the threaded component.

11. The system of claim 1 further including a cooling device attached to the hydraulic motor support member between the first and second ends thereof, and, coupled to the hydraulic pump and the hydraulic motor, the cooling device structurally configured to cool hydraulic fluid.

\* \* \* \* \*